United States Patent [19]

Smalarz et al.

[11] 3,905,237
[45] Sept. 16, 1975

[54] TEMPERATURE COMPENSATED PRESSURE GAUGE

[75] Inventors: Anthony A. Smalarz, Agoura; Roger T. Yule, Canoga Park, both of Calif.

[73] Assignee: Kratos, Pasadena, Calif.

[22] Filed: Sept. 23, 1974

[21] Appl. No.: 508,289

[52] U.S. Cl. .................... 73/393; 73/345; 73/389
[51] Int. Cl.² ........................................ G01L 19/04
[58] Field of Search ............. 73/393, 345, 389, 418, 73/412; 340/229, 266

[56] References Cited
UNITED STATES PATENTS
3,815,417   6/1974   Smialowicz ......................... 73/389

*Primary Examiner*—Donald O. Woodiel
*Attorney, Agent, or Firm*—John Holtrichter, Jr.

[57] ABSTRACT

A pressure gauge visibly indicating on a dial face the pressure of a gas medium being monitored as it relates to a predetermined minimum allowable pressure and also simultaneously as to a maximum allowable pressure which together define an acceptable operating zone over a predetermined temperature range, the gauge including a first Bourdon coil internally communicating with the gas medium being monitored and mounted in a gauge housing in which is sealed a gas medium similar in pressure/temperature characteristic to the monitored gas medium and at the minimum allowable pressure, and also including a second Bourdon coil mounted in the housing and in which is sealed a similar gas medium at the maximum allowable pressure, a movable end of the first coil being coupled to a dial pointer and a movable end of the second coil being coupled to a dial flag, the housing being located relative to the temperature environment of the gas medium being monitored so that all components and gas mediums in the housing being subject to essentially the same temperature as that of the monitored gas medium.

10 Claims, 4 Drawing Figures

TEMPERATURE COMPENSATED PRESSURE GAUGE

BACKGROUND OF THE INVENTION

The background of the invention will set forth in two parts.

FIELD OF THE INVENTION

The present invention pertains generally to the field of pressure sensing gauges, and more particularly to the field of gas pressure gauges which are compensated to account for variations in gas pressure due to gas temperature variation.

DESCRIPTION OF THE PRIOR ART

Bourdon tube gauges are probably the most commonly used pressure measuring devices known. They consist of a flattened tube of spring bronze or steel bent into a circle, so that in increase of pressure inside the tube tends to straighten the tube. One end of the tube is fixedly mounted in the gauge and its interior communicates with a source of pressure, the other end of the tube is free to move and does so proportionally to the pressure difference existing between the inside and outside of the tube. A pointer is generally attached by linkage to the tube's free end and thus rotates with tube movement to provide a visible pressure indication on a graduated scale on the gauge's face.

In certain applications, it has been found desirable to amplify the motion of the Bourdon tube so that a greater pointer deflection could be obtained for a given pressure differential. This was accomplished by bending the tube through several turns to form spiral or helical elements.

In practice, it has been found that Bourdon tubes are not only sensitive to pressure differential conditions, but also to temperature differentials. This effect can cause an erroneous gauge reading and should be overcome. One solution to this problem has been to add in series with the Bourdon tube-to-gauge pointer linkage, a temperature compensating spring which reacts to temperature as well as to the force provided by a moving Bourdon tube to tend to cancel the effects of a changing temperature environment. Since such springs have proven to be necessarily delicate and fragile, several improvements in design have been made over the years to brace the spring, and thus guard it against damage from vibration, jolting, or other rough treatment.

Another technique which has been utilized in order to provide temperature compensation for such indicators is that of providing a second Bourdon tube in the gauge which is mechanically coupled to the dial pointer in such a manner that it tends to cause an oppositely directed movement to the pointer due to temperature changes to that of the primary pressure sensing tube. This, in effect tends to cancel out pointer movement due to temperature changes and only tube movement caused by pressure differentials are visible on the meter face.

Other gauge configurations also use two Bourdon tubes. For example, a pressure differential indicating gauge has been developed in which a single pointer, appropriately coupled to the movable ends of two Bourdon tubes sensing different pressure systems, indicates the pressure differential between the two pressure systems without requiring the reading of two different meters or the reading of one meter with two independent pointers and therefrom making calculations to obtain the desired pressure differential.

Another example of a double Bourdon tube configuration is one in which one tube is coupled to the movable end of the other tube so that each tube need only move an amount normally required for half scale pointer deflection in order to obtain full scale deflection. This scheme tends to overcome a problem found in some systems where elastic hysteresis of a Bourdon tube is of importance.

In none of the above-described Bourdon tube pressure gauges is there any mechanism or other arrangement provided which will accurately and continuously indicate on a single gauge face, the pressure of a gaseous system as it compares to minimum and maximum allowable limit over an extended temperature range. It should therefore be evident that a technique which can do so while providing continuous compensation for changes in gas temperature (the gas law: $pv = T$), would constitute a significant advancement of the art.

SUMMARY OF THE INVENTION

In view of the foregoing factors and conditions characteristic of the prior art, it is a primary object of the present invention to provide a new and improved temperature compensated pressure gauge.

Another object of the present invention is to provide a relatively simple-to-fabricate yet highly accurate and reliable gas pressure gauge that incorporates a pair of Bourdon coils in a manner that continuously compensates the gauge reading for any changes in the temperature of the gas being monitored.

Still another object of the present invention is to provide a temperature compensated pressure gauge which does not utilize fragile temperature compensating springs or complicated mechanical arrangements for coupling two different gauge elements to a single gauge pointer.

Yet another object of the present invention is to provide a temperature compensated pressure gauge which continuously indicates the pressure of a monitored gas medium as it relates to an acceptable operating pressure zone over a relatively extensive temperature range.

According to the present invention, a temperature compensated pressure gauge for indicating the gas pressure being monitored relative to an acceptable operating zone defined by minimum and maximum allowable pressure limits over a predetermined temperature range includes a gas medium sealed in a pressure gauge housing that has a visible dial face with a fixed marking indicating the minimum allowable pressure limit. The gas medium has essentially the same pressure-to-temperature characteristic as that of a gas medium being monitored, the gas medium sealed in the housing being at the aforesaid minimum allowable pressure. The housing is located in the same temperature environment as that of the gas medium being monitored and the contents of the gauge housing are subject to essentially the same temperature. Pressure sensing means, including a first Bourdon coil mounted in the gauge housing, is disposed in the gas medium sealed in the housing, the interior of which coil being coupled to a port in the housing for communication only with the gas medium being monitored. The first Bourdon coil includes a movable end portion operatively coupled to the first dial indicator member, a non-temperature related changing pressure differential of a gas medium in the first coil as compared with that of the gas medium sealed in the housing causing rotational movement of the movable end portion and of the first dial indicator member relative to the fixed marking on the dial face. The invention further includes reference means with a second Bourdon coil mounted in the gauge housing and disposed in the gas medium sealed therein. The second coil having a gas medium sealed therein with essentially the same pressure-to-temperature characteristic as that being monitored, and also has a movable end portion operatively coupled to a second dial indicator member, the second coil having essentially the same pressure differential-caused movement characteristic as that of the first Bourdon coil, whereby the special relationship between the fixed marking on the dial face and the second dial indicator member continuously define the acceptable operating zone over the aforesaid predetermined temperature range. Additionally, the first dial indicator member indicates the pressure of a gas being monitored relative to the acceptable operating zone.

In accordance with one embodiment of the invention, the two Bourdon coils are essentially spiral in form and parallel to each other about a common axis, while in another embodiment, the coils are essentially helical in form, one of which is disposed coaxially with respect to the other.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawing in which like reference characters refer to like components in the several views.

DESCRIPTION OF THE INVENTION

Figure 1:
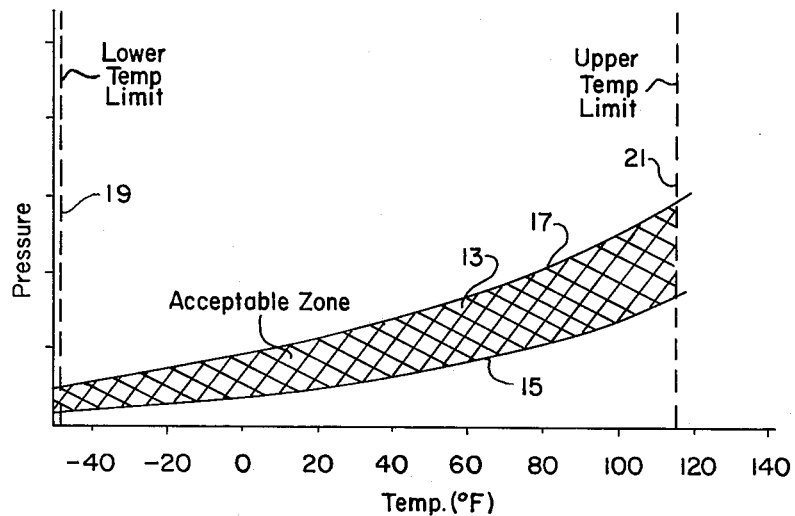
FIG. 1 is a graphical presentation of gas pressure vs. gas temperature illustrating an acceptable operating zone of a gas system monitored by a pressure gauge constructed in accordance with the present invention.
Figure 2:
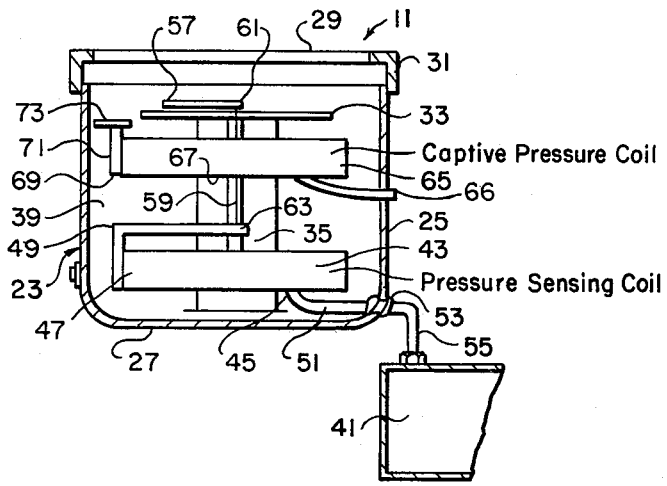
FIG. 2 is a sectional representation in elevation of a temperature compensated pressure gauge constructed in accordance with one embodiment of the present invention.
Figure 3:
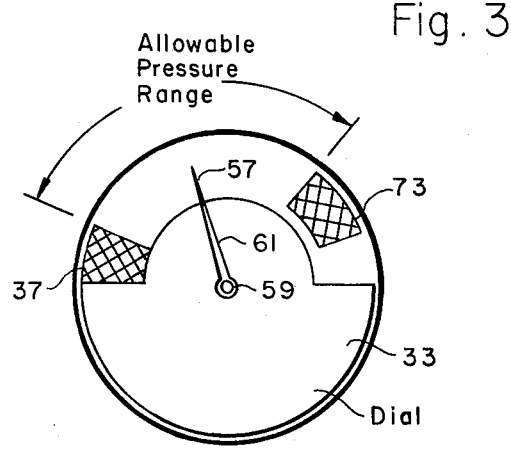
FIG. 3 is a plan view of the dial face of the gauge of FIG. 2.

Referring now to the drawing and more particularly to the graph of FIG. 1 and the gauge illustrated in FIGS. 2 and 3, there is shown a temperature compensated pressure gauge 11 for indicating the pressure of a gas medium being monitored, the pressure lying in an acceptable operating zone 13 defined by a minimum allowable pressure limit curve 15 and a maximum allowable pressure limit curve 17 over a predetermined temperature range bounded by a lower limit 19 and an upper limit 21.

The gauge 11 includes a cylindrical cup-like housing 23 having a cylindrical side wall 25, a base portion 27 and a gauge face plate 29 held in place by a circular edge flange 31. As seen in FIG. 3, the face plate 29 is transparent and allows the viewing of a dial plate 33 which is fixedly mounted on a central pedestal 35 extending upwardly from the base portion 27 of the housing. The dial plate 33 is provided with a fixed marking or flag 37 indicating the minimum allowable pressure limit graphically shown as curve 15 in FIG. 1. In accordance with the practice well known in the art, the housing 23 is constructed to be gastight and able to safely withstand any gas pressure introduced in its interior through a sealable port 38.

A gas medium 39 is disposed and sealed in the housing at the minimum allowable pressure (for a given temperature), the gas medium either having the same composition as the gas medium being monitored or having the same pressure-to-temperature characteristic as that of the monitored gas.

The housing 23 may either be monitored in a tank or other vessel containing the gas medium, or it may be monitored in such physical relationship (or by other conventional means such as a conventional remote-sensing temperature control arrangement) to a container herein identified by reference numeral 41 containing the gas medium, as to subject the housing and its contents to essentially the same temperature environment as that of the monitored gas medium in the container.

A first conventional spiral-wound Bourdon coil 43 is mounted in the container such that its inner end 45 is fixed to and supported by the pedestal 35, while its free or movable end 47 is attached to a pointer linkage arrangement 49. The fixed inner end 45 includes a coupling portion 51 extending to and communicating with a port 53 in the housing 23. In a layout wherein the gauge is mounted in a tank, the port 53 is left open and thus communicates directly with the gas in the tank. In a layout wherein, as shown in FIG. 2, the gauge housing is externally mounted, the interior of the first Bourdon coil 43 communicates with the interior of the container 41 by means of a bleeder line or tubing 55.

Since the interior of the container is pressurized to the minimum allowable pressure and is essentially at the same temperature as that of the gas being monitored, the first movable end of the first Bourdon coil 43 will move in response to a changing differential pressure between the gas medium 39 sealed in the housing and the gas medium within the first Bourdon coil. Thus, this differential pressure is continuously available as a visible readout by viewing the relationship of the flag 37 and a pointer 57 which is coupled to the movable end 47 of the coil 43 by means, in this embodiment, of a slender elongated post 59 attached to an inner end 61 of the pointer 57 and to an inner end 63 of the pointer linkage arrangement 49.

Also mounted in the housing 23 is a second conventional spiral-wound Bourdon coil 65 that has a closed inner end 67 attached to the pedestal 35 and an outer movable end 69 attached by means of a vertical post 71 to a movable flag 73 which continuously indicates the maximum allowable pressure limit (see 17 in FIG. 1) of the acceptable operating zone. The coil 65 is coupled at its inner end to a sealable opening 66 in the housing, and sealed within this second coil 65 at the maximum allowable pressure limit for a given temperature within its temperature range, is a gas medium having essentially the same pressure-to-temperature characteristic as that of the gas medium sealed in the container, and of course, it may be of the same composition. The second coil also has the same pressure differential-caused movement characteristic as that of the first Bourdon coil 43.

As with the first Bourdon coil 43, the second coil 65 is completely immersed in the gas medium 39 sealed in the container 23 and thus the movable flag 73 continuously indicates a pressure differential above the minimum allowable pressure (always indicated by the first flag 37) for any temperature between the lower limit 19 and the upper limit 21, as illustrated in FIG. 1. Thus, the gauge 11 provides a continuous visible pressure readout of the gas medium being monitored as it relates to an acceptable operting zone over a predetermined temperature range.

Figure 4:
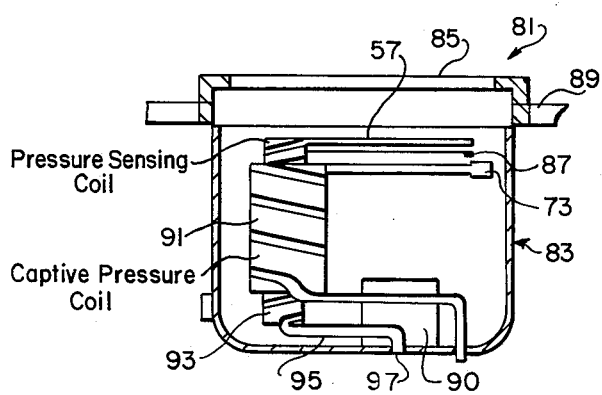
FIG. 4 is a sectional representation in elevation of a temperature compensated pressure gauge constructed in accordance with another embodiment of the present invention.

Referring now to FIG. 4, there is shown another embodiment of the present invention. Here, a temperature compensated pressure gauge 81 includes a housing 83 similar to the housing 23, with a face plate 85 and a dial plate 87 similar to the dial plate 33. The gauge 81 may be mounted in a location exterior to a container, tank or line containing a gas medium being monitored, or it may be mounted in a tank or container, a portion of which is indicated by reference numeral 89.

Mounted within the housing 83 and supported by a pedestal 90 is a captive pressure Bourdon coil 91 and a coaxially disposed pressure sensing Bourdon coil 93, both wound in helical configurations and having their respective upper ends connected to a movable flag similar to flag 73 and to a pointer similar to the pointer 57, respectively, as seen in FIG. 3. The coils 91 and 93 operate essentially in the same manner as do their counterparts, Bourdon coils 43 and 65, previously described. Thus, it will be noted that both ends of the captive coil 91 are sealed, while an inner end 95 of the pressure sensing coil 93 is coupled to a port 97 in the housing 93 so that the interior of the coil 93 is continuously in communication with a gaseous medium being monitored; in this case, the gas medium in the container 89.

From the foregoing, it should be evident that there have been described new and improved embodiments of a temperature compensated pressure gauge that is accurate and reliable and incorporates a pair of Bourdon coils in a manner to continuously visibly indicate the pressure of a gas medium as it relates to an acceptable operating pressure zone over a relatively extensive temperature range.

Although specific materials and physical configurations have been described above in detail, it should be understood that any material and configuration having the same desired characteristic and function may be utilized. For example, the Bourdon coil may be in a form other than the simple helical and spiral configuration shown, and may be fabricated from a suitable material other than spring bronze or steel. Further, other arrangements may be used to couple the movable ends of the Bourdon coils to their associated dial indicating members. Accordingly, it is intended that the foregoing disclosure and drawings shall be considered as illustrations of the principles of the invention.

What is claimed is:

1. A temperature compensated pressure gauge for indicating the gas pressure being monitored relative to an acceptable operating zone defined by minimum and maximum allowable pressure limits over a predetermined temperature range, the gauge comprising:

a pressure gauge housing including a visible dial face with a fixed marking indicating said minimum allowable pressure limit;

a gas medium sealed in said housing, said gas medium having essentially the same pressure-to-temperature characteristic as that of a gas medium being monitored, said gas medium sealed in said housing being at said minimum allowable pressure, said housing being located in the same temperature environment as that of the gas medium being monitored and the contents of said housing being subject to essentially the same temperature;

pressure sensing means including a first Bourdon coil mounted in said housing and disposed in said gas medium sealed therein, the interior of which coil being coupled to a port in said housing for communicating only with the gas medium being monitored, said first coil including a movable end portion operatively coupled to a first dial indicator member, a non-temperature related changing pressure differential of a gas medium in said first coil as compared to that of said gas medium sealed in said housing causing rotational movement of said movable end portion and of said first dial indicator member relative to said fixed marking on said dial face; and reference means including a second Bourdon coil mounted in said housing and disposed in said gas medium sealed therein, said second Bourdon coil having a gas medium with essentially the same pressure-to-temperature characteristic as that being monitored sealed therein and also having a movable end portion operatively coupled to a second dial indicator member, said second Bourdon coil having essentially the same pressure differetial-caused movement characteristic as that of said first Bourdon coil, the spatial relationship between said fixed marking on said dial face and said second dial indicator member for continuously defining said acceptable operating zone over said predetermined temperature range, said first dial indicator member indicating the pressure of a gas being monitored relative to said acceptable operating zone.

2. The temperature compensated pressure gauge according to claim 1, wherein said first dial indicator member is a relatively narrow elongated pointed rotatably supported at its end adjacent the center of said dial face, and wherein said second dial indicator member is in the form of a relatively broad flag movable in a broad arc about said center of said dial face.

3. The temperature compensated pressure gauge according to claim 1, wherein said gas medium sealed in said housing and sealed in said second Bourdon coil are of the same composition.

4. The temperature compensated pressure gauge according to claim 1, wherein said gas medium sealed in said housing and sealed in said second Bourdon coil are of the same composition as that of the gas medium being monitored.

5. The temperature compensated pressure gauge according to claim 1, wherein said gas medium sealed in said housing and sealed in said second Bourdon coil are not the same composition as that of the gas medium being monitored but do have essentially the same pressure-to-temperature characteristic as that of the gas medium being monitored.

6. The temperature compensated pressure gauge according to claim 1, wherein said first and second Bourdon coils are essentially spiral in form and parallel to each other about a common axis.

7. The temperature compensated pressure gauge according to claim 6, wherein said second Bourdon coil is mounted in said housing between said first Bourdon coil and said dial face, said first Bourdon coil being operatively coupled to said first dial indicator member through the center of said second Bourdon coil.

8. The temperature compensated pressure gauge according to claim 1, wherein said first and second Bourdon coils are essentially helical in form, one of which coils being disposed coaxially with respect to the other of said coils.

9. The temperature compensated pressure gauge according to claim 8, wherein one of said Bourdon coils at least partially lies within the other of said coils.

10. The temperature compensated pressure gauge according to claim 9, wherein said first Bourdon coil at least partially surrounds said second Bourdon coil.

* * * * *